(12) United States Patent
Ropp et al.

(10) Patent No.: US 8,240,764 B2
(45) Date of Patent: Aug. 14, 2012

(54) ADJUSTABLE VEHICLE SEAT SUSPENSION ASSEMBLY

(75) Inventors: Dale Ropp, Buda, IL (US); Cole T. Brodersen, Davenport, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 12/592,069

(22) Filed: Nov. 18, 2009

(65) Prior Publication Data

US 2011/0115270 A1    May 19, 2011

(51) Int. Cl.
B60N 2/02 (2006.01)
A47C 1/00 (2006.01)
(52) U.S. Cl. .................. 297/337; 297/344.13
(58) Field of Classification Search .......... 297/337, 297/338, 344.13, 329
See application file for complete search history.

(56) References Cited

U.S. PATENT DOCUMENTS

| | | | | |
|---|---|---|---|---|
| 6,079,786 | A * | 6/2000 | Kirkland et al. | 297/344.24 |
| 6,986,550 | B2 * | 1/2006 | Gevaert et al. | 297/337 |
| 7,172,250 | B2 * | 2/2007 | Wu | 297/344.1 |
| 7,866,751 | B2 * | 1/2011 | Downey | 297/344.24 |

* cited by examiner

*Primary Examiner* — Sarah B McPartlin
(74) *Attorney, Agent, or Firm* — Lane & Waterman LLP

(57) ABSTRACT

A vehicle seat suspension assembly comprises a base, a support member, first and second latch members, and first and second actuators. The seat support member slides forward horizontally and pivots vertically upward. The first latch member has horizontally spaced locking elements and a movable first latch cooperating with one of the locking elements to lock the support member in one of a plurality of horizontal positions. The second latch member has vertically spaced locking elements and a movable second latch cooperating with one of these locking elements to lock the support member in one of a plurality of vertical or tilted positions. The first and second actuators are mounted adjacent the front end of the support member and operatively connected to the first and second latches, respectively.

2 Claims, 4 Drawing Sheets

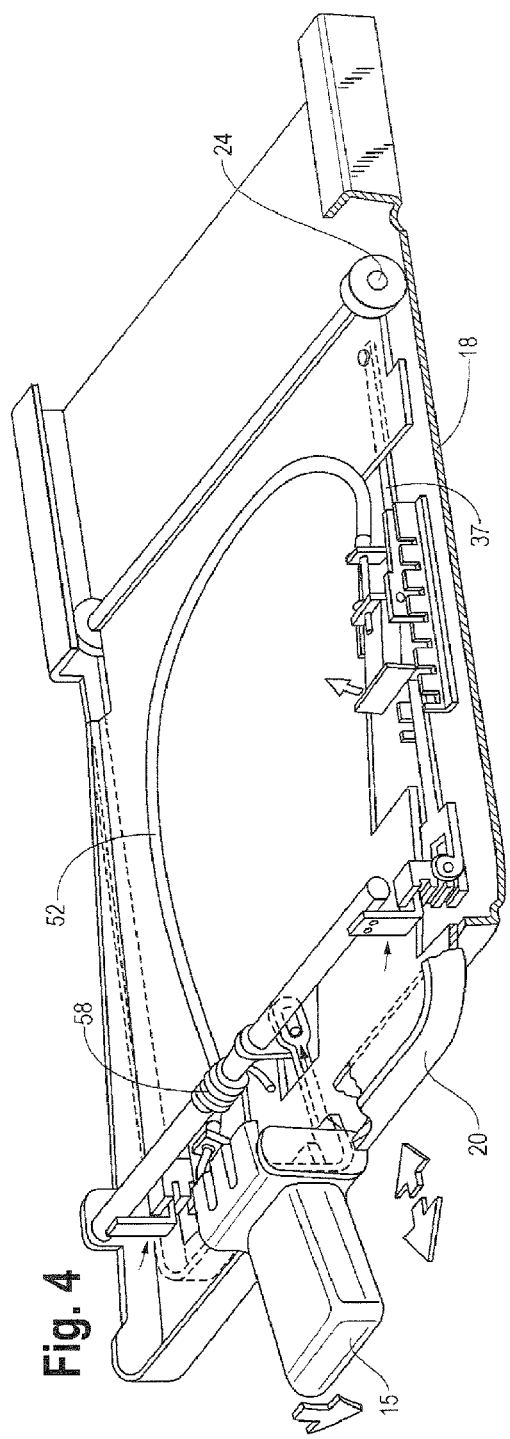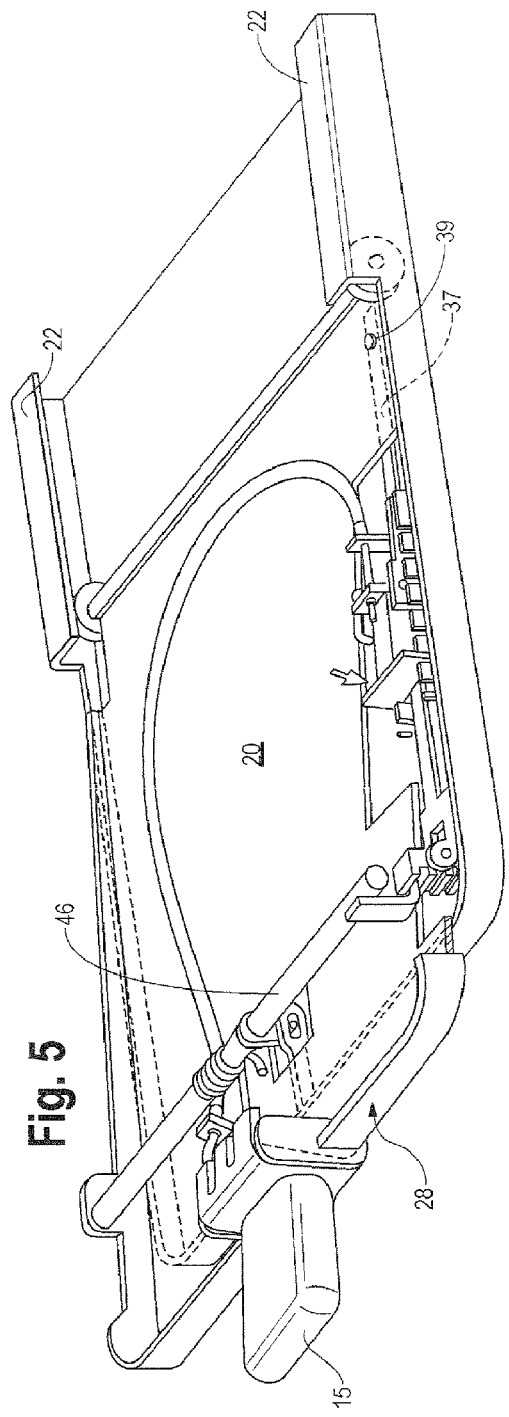

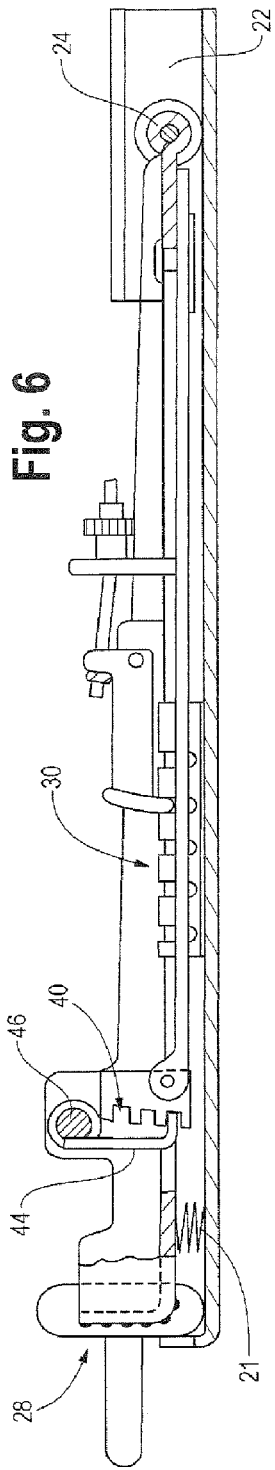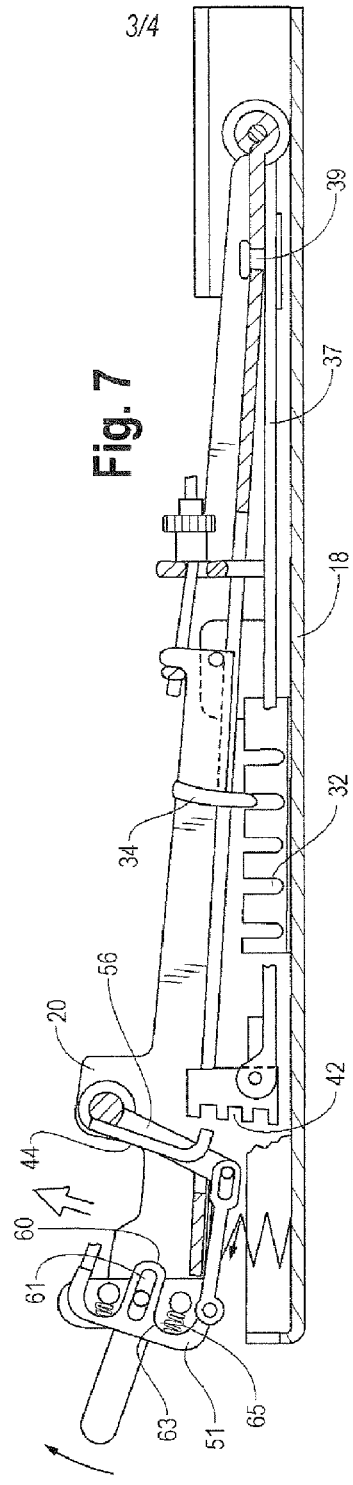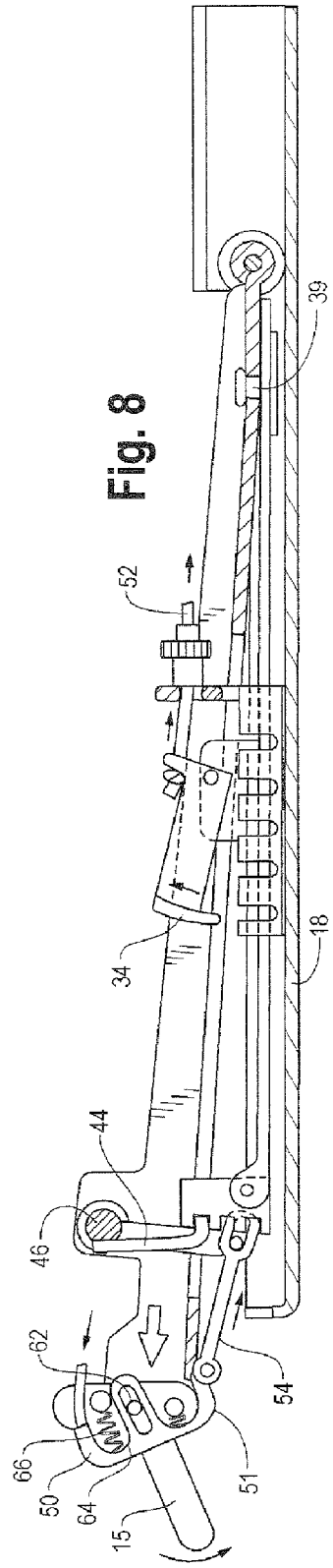

ADJUSTABLE VEHICLE SEAT SUSPENSION ASSEMBLY

BACKGROUND OF THE INVENTION

The present invention relates generally to seat technology. More specifically, the invention relates to a vehicle seat suspension assembly that permits both forward extension and vertical adjustment of the seat position.

It is well known in the seating arts that a vehicle operator's comfort may be enhanced by adjustment of the seat cushion's position relative to the seat backrest. For this reason, it is common practice in the design of seat suspensions to provide for both forward extension and vertical or tilt adjustment of the seat, independently of the backrest. However, the prior art arrangements directed to this purpose are often mechanically complex and cumbersome, occupying more space than is desirable in current vehicle cab compartments where space is at a premium. With increased mechanical complexity, the costs associated with the prior art adjustment devices may be high. Also, the position and number of control levers or knobs for making these seat adjustments are often not ideally suited to facilitate ease of operation.

SUMMARY OF THE INVENTION

The present invention is directed to a vehicle seat suspension assembly that affords both forward extension and vertical or tilt adjustment of the seat cushion independently of the backrest, while overcoming the disadvantages associated with the prior art. The vehicle seat suspension assembly, made in accordance with the present invention, provides fore and aft and tilt adjustment of the seat, and comprises a base, a support member slidably and pivotally mounted to the base, first and second latch devices, and first and second actuators. The seat support member has a front end that extends forward and away from the seat backrest as the support member slides horizontally and moves vertically upward as the support member pivots relative to the base. The first latch device is operatively associated with the base and seat support member and has horizontally spaced locking elements and a movable first latch cooperating with one of the locking elements to lock the support member in one of a plurality of horizontal positions. The second latch member is also operatively associated with the base and seat support member and has vertically spaced locking elements and a movable second latch cooperating with one of these locking elements to lock the support member in one of a plurality of vertical or tilted positions. The first actuator is mounted to the support member adjacent its front end and is operatively connected to the first latch for disengaging the first latch device, and the second actuator is also mounted to the support member adjacent the support member front end and is operatively connected to the second latch for disengaging the second latch device.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIGS. 3 to 5 are still further perspective views showing details of construction and operation of the seat suspension assembly used in the vehicle seat of FIG. 1;

FIGS. 6 to 8 are cross sectional views illustrating further details of construction and operation of the seat suspension assembly shown in FIGS. 3 to 5.

DETAILED DESCRIPTION OF THE PREFERRED EMBODIMENTS

Figure 1:
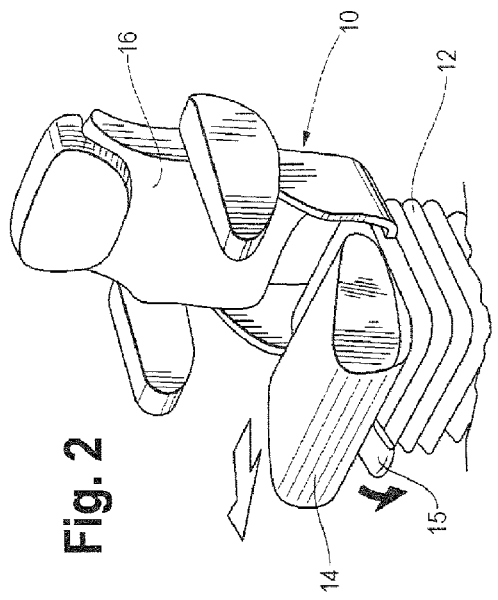
FIG. 1 is a perspective view of a vehicle seat showing the vertical or tilt adjustment operation of the seat cushion relative to the base and backrest.
Figure 2:
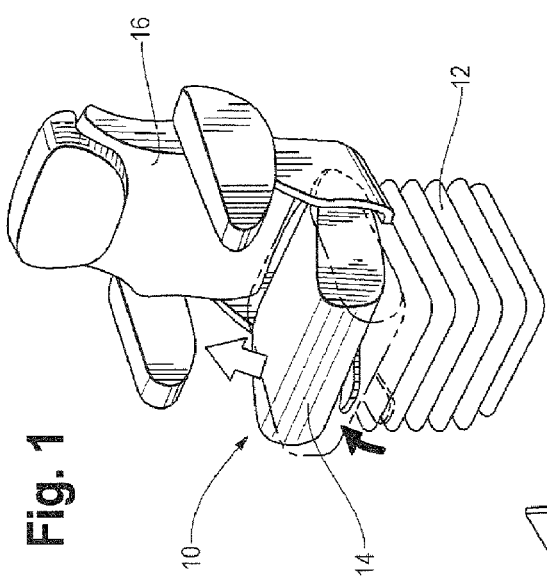
FIG. 2 is also a perspective view similar to that of FIG. 1 but showing the fore extension of the seat cushion relative to the base and backrest.
Figure 3:
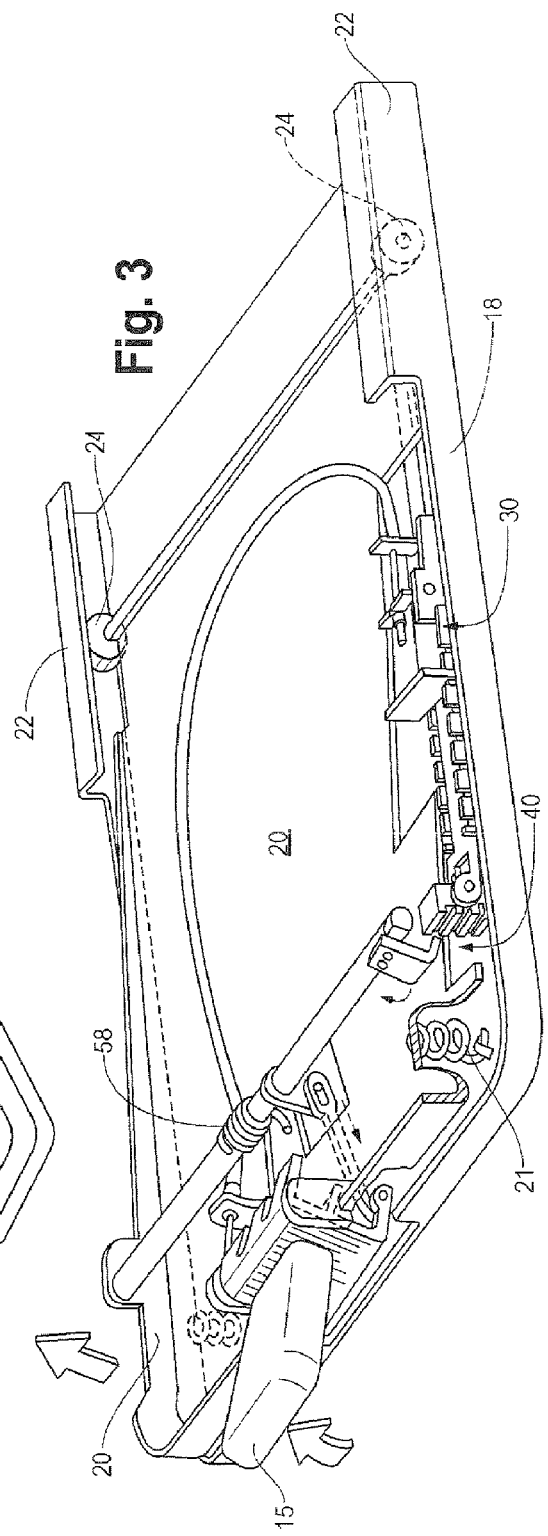

With reference to the drawings, FIGS. 1 and 2 show a vehicle seat 10 mounted to a suspension 12, and having a seat cushion 14 and backrest 16. FIG. 1 shows that the vertical position or tilt of the seat cushion may be adjusted relative to the backrest. FIG. 2 shows that the horizontal position of the cushion may be adjusted fore and aft relative to the backrest. Both Figures show a control lever 15 operable to permit either the vertical or horizontal adjustment of the seat.

FIGS. 3-8 show details of construction of the seat suspension assembly. In accordance with the present invention the seat suspension assembly includes a base 18 and a support member 20. The base has opposing channels or tracks 22 which are sized to receive and cooperate with a pair of rollers 24 mounted to the back end 26 of the support member. Lift springs 21 are located between the base and support member to urge the support member upward and away from the base. This arrangement allows the support member 20 to slide horizontally and pivot vertically relative to the base 18, thereby moving the front end 28 of the support member in or out and up or down, relative to the base 18. The seat suspension assembly also includes first and second latch devices, 30 and 40, and first and second actuators, 50 and 51.

The first latch device 30 has a bracket 31 mounted in fixed position on the base 18 and having a series of spaced locking elements in the form of recesses 32. The first latch device also has a first movable latch 34 pivotally mounted to a bracket 35 which, in turn, is mounted to tie bar 37. The tie bar has one end attached to the support member 20 by means of fastener 39. The first actuator 50 is an upper extension of control lever 15 and is connected to the first latch device by means of cable 52.

The second latch device 40 has a bracket 41 mounted in fixed position on the base 18 and having a series of vertically spaced locking elements in the form of recesses 42. The second latch device also has a second movable latch 44 pivotally mounted to the support member 20 by means of rotatable latch rod 46. It is biased by torsion spring 58 to urge the movable latch 44 into engagement with one of the locking elements 42. The second actuator 51 is a lower extension of the control lever 15 and is connected to the second latch device by means of link 54 and drive arm 56 which has one end connected in fixed position on the latch rod 46.

As illustrated in FIGS. 3-8, manipulation of the control lever 15 will cause the first and second actuators to effect operation of the first and second latch devices, respectively. When the control lever is pushed down, the first actuator pulls on cable 52 causing the latch 34 to pivot upward and to disengage from the locking elements 32. The operator may then adjust the seat horizontally in the fore or aft direction. Release of the control lever 15, will then allow the latch 34 to once again engage the locking elements 32 and seat will be locked in its new horizontal position. Similarly, when the control lever is lifted, the second actuator 51 pulls on link 54 and the lower end of drive arm 56 which causes the latch rod 46 and the latch 44 to rotate and disengage the latch 44 from the locking elements 42. At this point, if the operator rises slightly to remove his weight from the seat, the lifts springs 21 will cause the seat to tilt upwardly to move the seat to a higher position. Release of the handle 15 will then allow the latch 44 to engage the locking elements 42 and hold the seat in the new tilt position.

In this embodiment, a single control lever is employed and conveniently located just below the operator's knees where it is easily accessed. Manipulation of this single control lever allows for both vertical and horizontal adjustment of the seat in a relatively simple and compact mechanical design. Control lever 15 is shown, in FIGS. 7 and 8, to include a central rib 60 having a pivot slot 61. This slot 61 rides on a pivot pin 62. The actuators 50 and 51 are each spaced from the central rib 60 thereby defining recesses 63 and 64 which house springs 65 and 66. The springs 65 and 66 act to urge the control lever 15 back to a neutral or home position as shown in FIG. 6 after the operator has pulled up on the lever, as shown in FIG. 7, or pushed down on the lever, as shown in FIG. 8.

Figure 9:
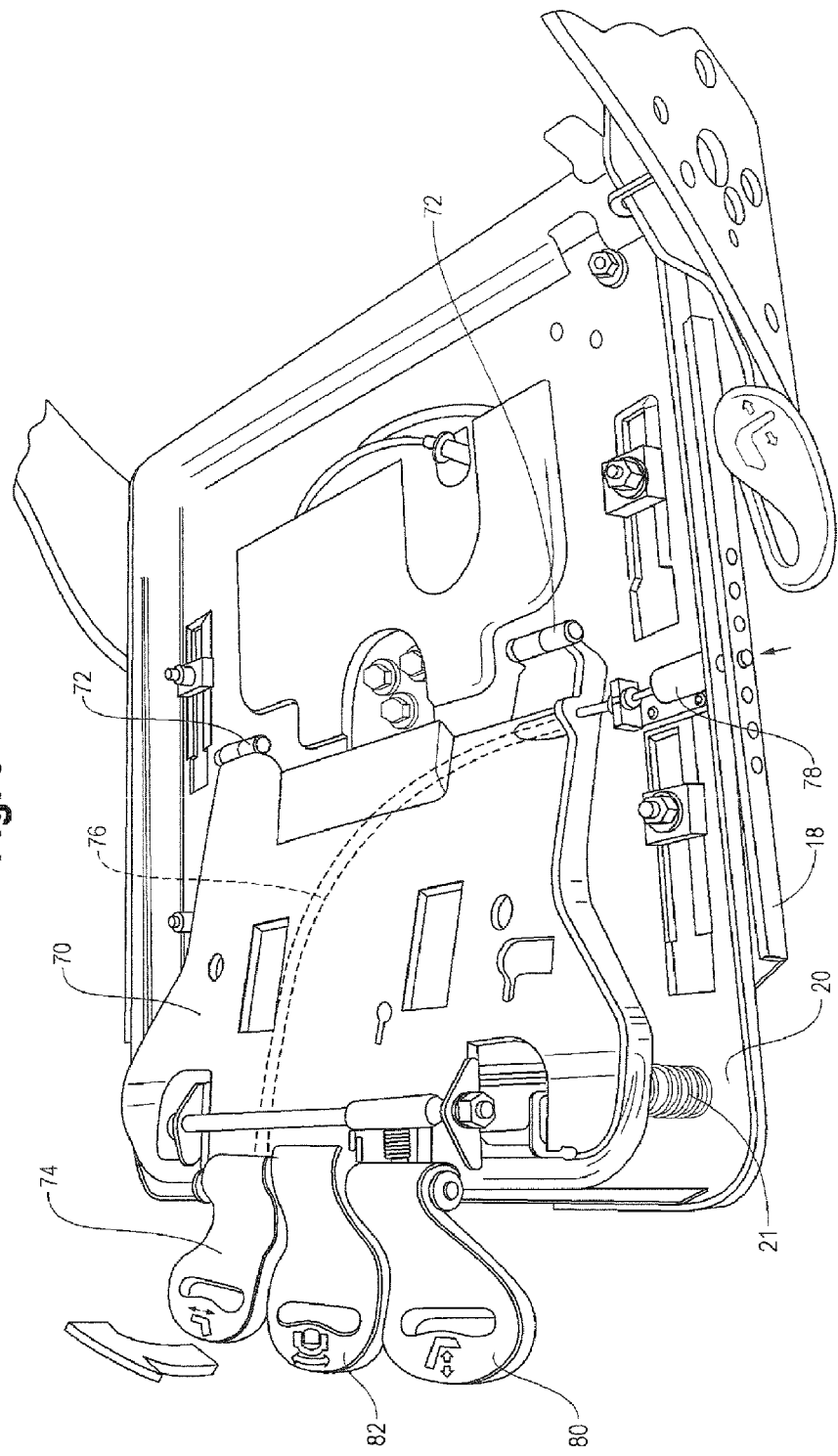
FIG. 9 is a perspective view of an alternative embodiment for the seat suspension assembly that may be used in the vehicle seat of FIG. 1.

FIG. 9 shows another preferred embodiment of the present invention. In this alternative embodiment, the support member 20 is slidably mounted to the base 18, but differs from the preceding embodiment in that a pivoting secondary support plate 70 is employed which is pivotally attached to the support member at pivot points 72. A series of three control levers are employed to effect movement of the seat. The first lever 74 operates a cable 76 to engage or disengage latch 78 when adjusting the fore and aft position of the seat. A second lever 80 operates to control adjustment of the vertical or tilt position of the seat, in the same manner as is disclosed above with respect to the first preferred embodiment. Finally, a middle lever 82 operates to permit swivel of the seat and backrest in a manner well known in the art.

It will be appreciated by those skilled in the art that various changes and modifications can be made to the illustrated embodiments without departing from the spirit of the present invention. All such modifications and changes are intended to be covered by the appended claims.

We claim:

1. A vehicle seat suspension assembly having fore and aft and tilt adjustment, comprising:
   a base;
   a seat support member having a front end and a back end, the seat support member being slidably and pivotally connected to the base to permit horizontal and vertical adjustment of the seat support member front end relative to the base;
   a first latch device operatively associated with the base and seat support member and having horizontally spaced locking elements and a movable first latch to lock the seat support member in one of a plurality of horizontal positions;
   a second latch device operatively associated with the base and seat support member and having vertically spaced locking elements and a movable second latch to lock the seat support member in one of a plurality of vertical positions;
   a first actuator mounted to the seat support member adjacent the seat support member front end and connected to the first latch for disengaging the first latch device;
   a second actuator mounted to the seat support member adjacent the seat support member front end and connected to the second latch for disengaging the second latch; and
   wherein the first latch device includes a horizontally extending track mounted in fixed position on said base and said first latch is pivotally mounted to the seat support member and engageable with said horizontal track, and said first latch maintains a generally constant vertical orientation relative to said track when said seat support member is vertically adjusted.

2. The vehicle seat suspension assembly of claim 1 wherein the second latch device includes a vertically extending track mounted in fixed position on said base and said second latch is pivotally mounted to the seat support member and engageable with said vertical track.

* * * * *